Figure 1:
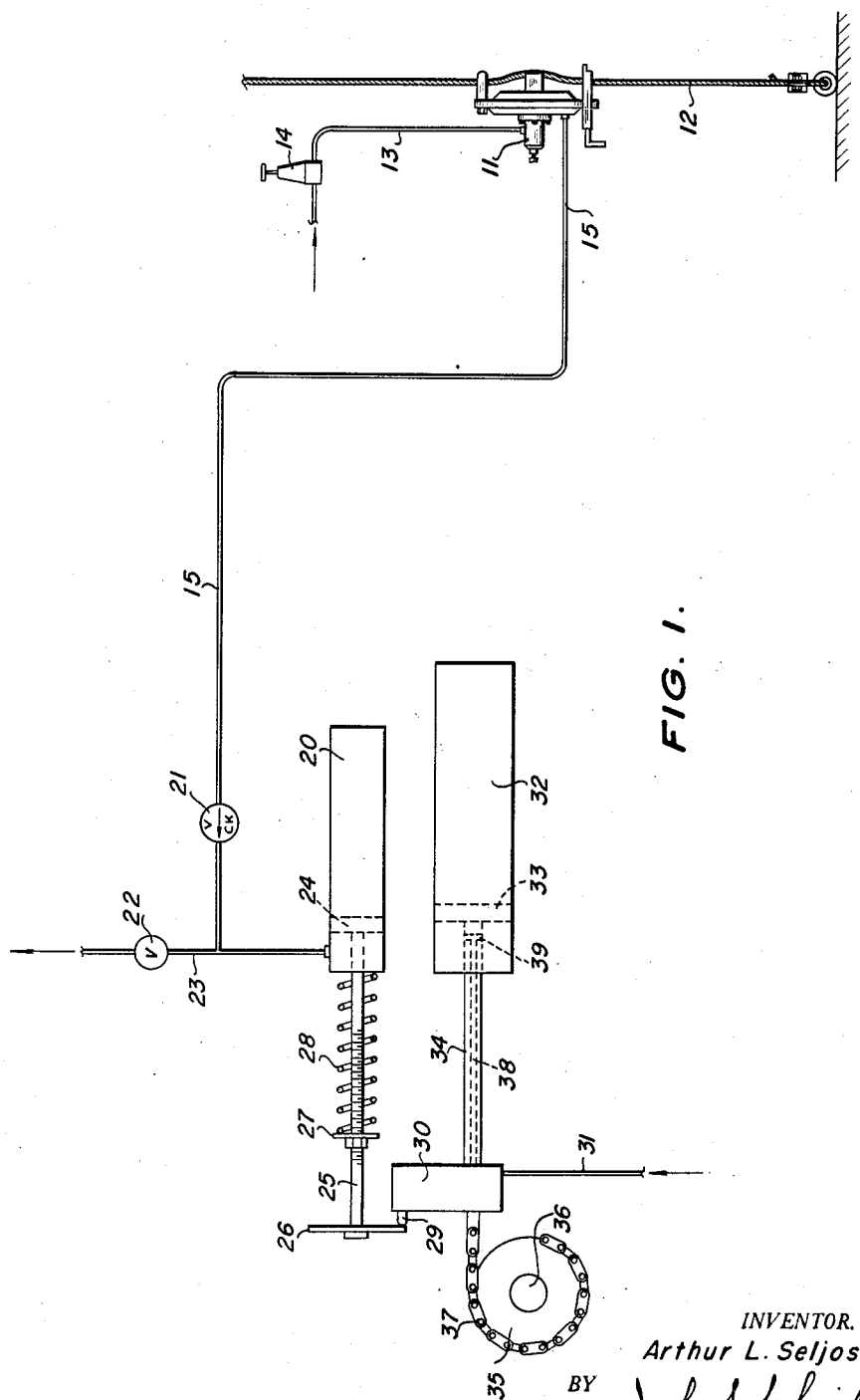

June 9, 1959    A. L. SELJOS    2,889,812
AUTOMATIC WATER LEVEL CONTROL FOR HYDROMATIC BRAKES
Filed Oct. 31, 1955    3 Sheets-Sheet 1

INVENTOR.
Arthur L. Seljos,
BY John S. Schneider
ATTORNEY.

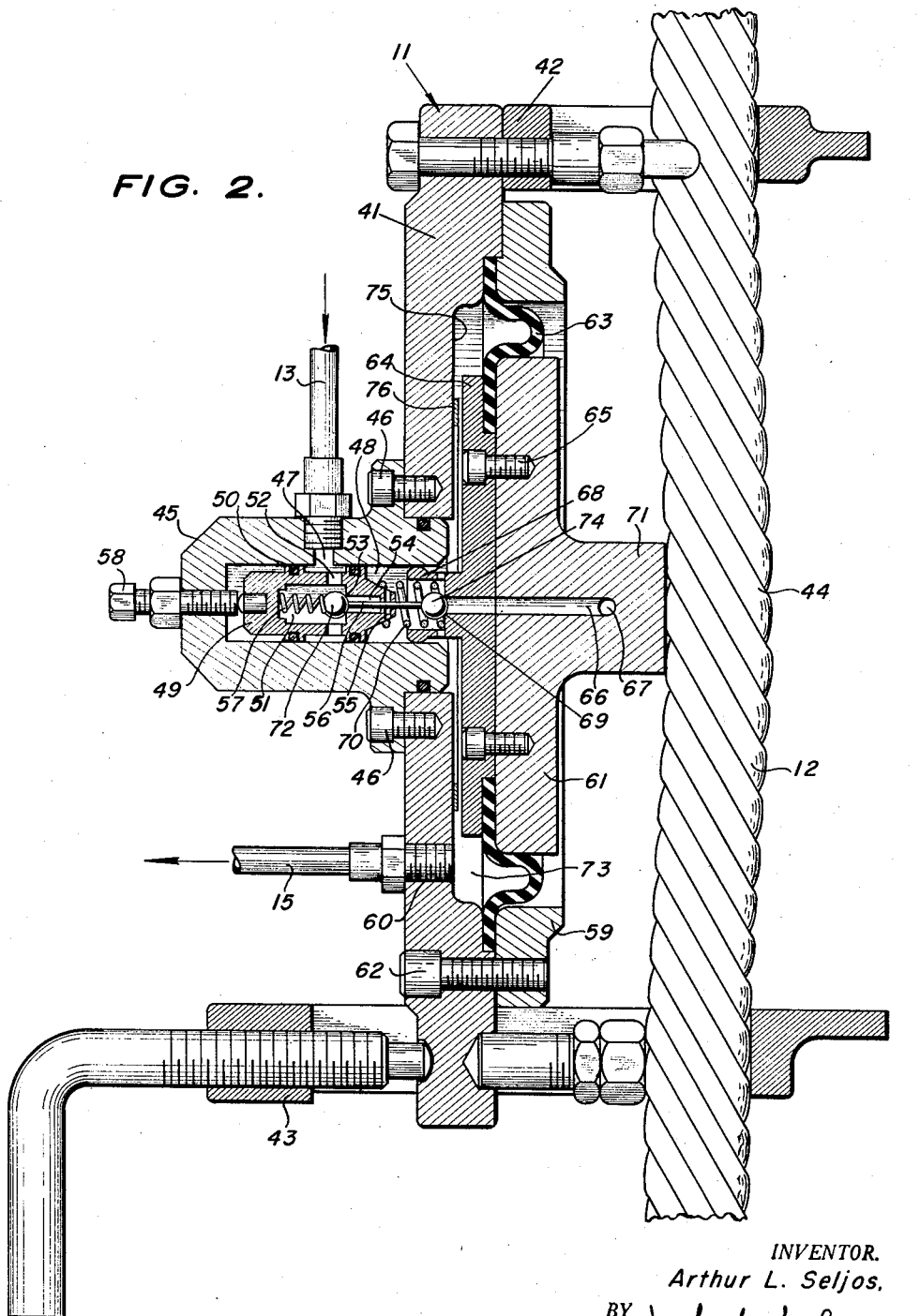

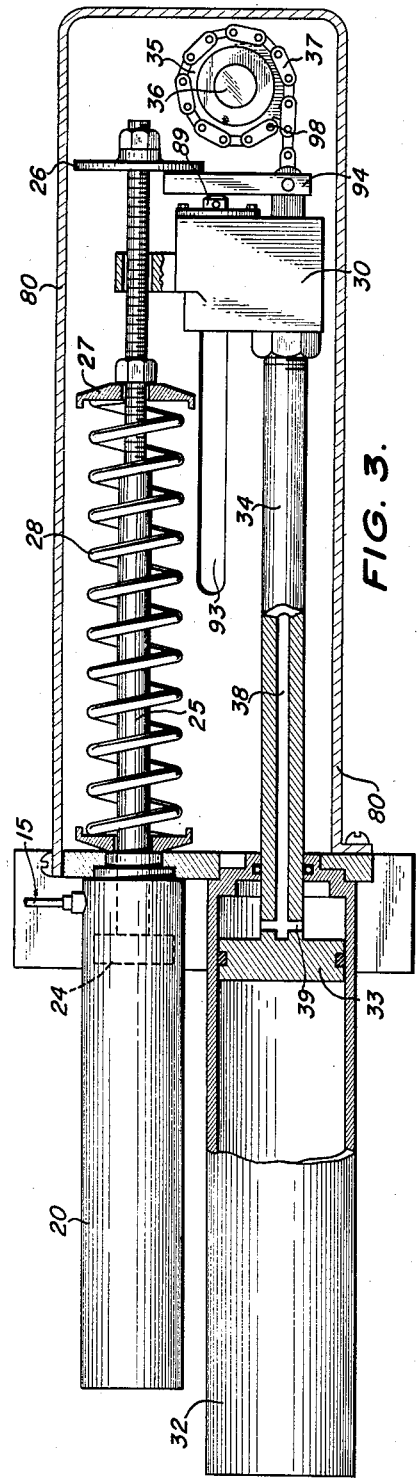

United States Patent Office 2,889,812
Patented June 9, 1959

2,889,812
AUTOMATIC WATER LEVEL CONTROL FOR HYDROMATIC BRAKES

Arthur L. Seljos, Houston, Tex., assignor, by mesne assignments, to Jersey Production Research Company, Tulsa, Okla., a corporation of Delaware Application October 31, 1955, Serial No. 543,746

6 Claims. (Cl. 121—41)

This invention is directed to a device for automatically regulating the water level in hydromatic brakes. More specifically, it is directed to automatically regulating the water level of a hydromatic brake for a drilling rig in proportion to the weight of the pipe lowered into the borehole.

In hydromatic brakes used for braking the lowering of the pipe in wells, increased water added to the brakes increases the braking force.

As shown, for example, in Shimek U.S. Patent 2,013,810, conventional deep well drilling apparatus includes a cable having one end known as the dead line connected to a fixed support. The tension in the dead line caused by the weight of the pipe supported by the live line may be measured by connecting to the dead line a weight responsive means adapted to transmit fluid pressure signals proportional to the weight supported by the live line. Such weight responsive means is utilized in the present invention.

Briefly, the present invention comprises a combination of elements wherein a pressure signal proportional to the weight of the supported drill string is used to position a spring loaded air pilot cylinder; a valve is movably attached to the pilot cylinder rod so that the pilot cylinder rod moves the valve to open position so as to admit fluid pressure to a master cylinder rod to which the valve is rigidly attached; the master cylinder rod upon movement operates a control which adjusts the water level of a brake unit at a rate proportional to the pressure signal until the master cylinder rod has moved to such position that the pilot valve is closed.

A weight responsive device is provided for indicating tension in the cable supporting the drill string. This device comprises an outer plate member provided with a fluid pressure signal port, a valve housing mounted on the outer plate provided with a fluid pressure source port, an inner plate mounted on the outer plate provided with a fluid pressure exhaust port, the inner plate having a lug thereon for contact with the cable, a diaphragm arranged on the inner and outer plates providing a chamber therebetween, valve means arranged in the valve housing adapted to regulate fluid flow through said ports, and a cable clamping means mounted on the outer plate adapted to kink the cable and to secure the outer plate to the cable.

This invention also contemplates a fluid operated control device which comprises a housing having pressure receiving means mounted therein adapted to receive pressure signals from a pressure signal source, a movable valve assembly mounted in the housing provided with a fluid pressure supply port, a fluid pressure exhaust port and a fluid pressure control actuator port, valve means arranged in the assembly adapted to regulate fluid flow through the ports, valve actuating means operatively connected to the pressure signal receiving means, and control actuating means mounted on the housing fluidly communicating with the fluid actuator control port whereby the pressure signals actuate the valve means thereby fluidly communicating the supply port and the control port to actuate the control.

Referring to the drawings:
Fig. 1 is a schematic illustration of the elements of the invention;
Fig. 2 is a sectional view of the fluid pressure weight indicator in operative position on the cable;
Fig. 3 is a plan view, partly in section, of the hydromatic brake control and actuating mechanism;
Fig. 4 is an elevational view of Fig. 3; and
Fig. 5 is an enlarged sectional view of the valve mechanism shown in Figs. 3 and 4.

Referring now to the drawings for a more complete description of the invention, Fig. 1 shows a weight responsive unit 11 secured to the dead line or cable 12 of a drilling rig. An air supply conduit 13 fluidly connected to a supply of compressed air, not shown, and having a regulating valve 14 positioned therein connects into the weight responsive unit 11. A fluid pressure signal outlet conduit 15 is shown connected to the weight responsive unit 11; this conduit extends to a pilot fluid cylinder 20 and is provided with a check valve 21 which permits flow into cylinder 20. A manually operated bleeding valve 22 is positioned on a conduit 23 which connects with conduit 15 between the check valve and the pilot cylinder 20 so that fluid may be bled from pilot cylinder 20, if desired. Pilot cylinder 20 has positioned therein a piston head 24 to which is connected a piston rod 25 provided with a follower head 26 at its free outer end. Piston rod 25 is also provided with a spring stop member 27 and a spring 28 adapted to bias the piston rod to the left, as shown in the drawing. Follower head 26 operatively connects with a contact member 29 which, in turn, is connected to a valve mechanism contained in a valve assembly 30. Valve assembly 30 is in fluid communication with a source of air under pressure, not shown, by means of air supply conduit 31. Valve assembly 30 is directly connected with piston head 33 slidably disposed in master cylinder 32 by means of hollow piston rod 34. A link chain 37 connects valve assembly 30 to control valve shaft 36 by means of a chain sprocket 35. The hollow piston rod 34 provides a fluid passage 38 which connects into piston cylinder 32 through fluid passage 39.

Referring more particularly to Fig. 2 wherein the weight responsive unit is shown, a cable 12 is secured to an outer plate 41 by means of upper and lower clamping members 42 and 43. These clamping members are adjusted as is conventional in the art to cause a kink to be formed in cable 12 as at 44. A valve housing 45 is secured to outer plate 41 by means of screw bolts 46. The valve housing 45 is provided with a fluid pressure supply inlet port 47 which fluidly connects with a chamber 48 within valve housing 45. A member 49 positioned in chamber 48 is provided with an inner chamber 51 having fluid communication with chamber 48 and port 47 by means of the fluid passage 52. O-rings 50 provided on member 49 seal port 47 and passage 52 from the ends of chamber 48. Member 49 is provided with fluid passages 54 and 55 which fluidly communicate inner chamber 51 with one end of chamber 48. One end 72 of a dumb bell valve generally designated 56 is adapted to seat on valve seat 53 formed in member 49 at the inner end of passage 54. Dumb bell valve 56 is normally biased against valve seat 53 by means of spring 57 positioned in chamber 51. A suitable bolt such as 58 extends through valve housing 45 and adjustably contacts member 49 in the valve housing. Outer plate 41 is provided with a fluid pressure signal outlet port 60 which is adapted to provide fluid pressure signals to the pilot cylinder 20. Outer plate 41 has secured thereto a ring 59 by means of bolts 62. A plate 61 is spaced inwardly from ring 59. A lug portion 71 is formed on plate 61 and is adapted to contact cable 12.

A diaphragm 63 is secured at its outer periphery between the outer plate 41 and the ring 59 as shown and is secured at its inner periphery to inner plate 61 by means of a plate 64 and bolts 65. Plates 64 and 61 have a co-operating longitudinal passage 66 fluidly communicating with lateral passage 67 which, in turn, fluidly communicates with the atmosphere. Plate 64 has formed thereon a longitudinal projection 68 which extends into chamber 48. A valve seat 69 is provided in projection 68 at the inner end of passage 66 and is adapted to seat the other end 74 of dumb bell valve 56. A spring 70 is arranged between plate 64 and member 49 to normally bias member 49 away from plate 64. The inner surface 75 of plate 41 is provided with an annular stop member 76 which restricts the longitudinal travel of plate 64.

Figs. 3, 4 and 5 show the hydromatic valve control and actuating mechanism. A housing 80 is suitably mounted on supporting structure not shown. Pilot fluid pressure cylinder 20 and master fluid pressure cylinder 32 are secured to one end of housing 80 and conduit 15 fluidly communicates pilot air cylinder 20 and signal outlet port 60 of the weight responsive means. Piston rod 25 extends from piston cylinder 20 into housing 80. The valve assembly 30 is movably mounted in housing 80 adjacent piston rod 25 and is provided with a fluid pressure supply port 81, a fluid pressure actuator port 82, and a fluid pressure exhaust port 83. Port 82 fluidly communicates with passage 38 by means of passage 79 in valve assembly 30. Supply port 81 connects with a source of fluid pressure by means of pipe 92 which is movable in slot 93 in housing 80. Pipe 92 connects into supply conduit 31 as shown. Valve assembly 30 contains a chamber 85. Positioned in chamber 85 is a valve member 86 and an annular shoulder 87 provides a valve seat for valve member 86 on the inner walls of chamber 85. A spring 88 biases valve member 86 to a normally closed position. A hollow plunger 89 is arranged in chamber 85 and operatively connects with valve member 86. A spring 90 is arranged on plunger 89 and normally biases plunger 89 away from valve element 86. The hollow plunger 89 is provided with a fluid exhaust passage 91 communicating with exhaust port 83 at one end; the other end is adapted to abut against valve member 86 in order to seal off passage 91 from flow of fluid therethrough.

An arm 94, which with plunger 89 comprises contact member 29, is pivotally secured at one end to a valve assembly extension member 95 as at 96. The free end of arm 94 is adapted to be engaged by follower head 26 and in turn is adapted to engage spring biased plunger 89.

One end of roller chain 37 connects with extension member 95 at pivot point 96; the other end is secured to control valve shaft 36 as at 98. A hydromatic water level control valve generally designated 99 is secured to shaft 36 for rotative movement therewith by suitable means such as bolts 100. Water is supplied to the brake at a constant rate and the hydromatic valve adjusts the overflow level of the water. Valve 99 controls the overflow of water of the hydromatic brake thereby providing the desired braking effect.

In operation, referring more particularly to Fig. 2, increased tension in cable 12 resulting from increased pipe weight causes movement of cable 12 to the left as shown thereby exerting a force on lug 71 of inner plate 61. This force is transmitted to dumb bell valve 56 causing inner ball member 72 to move off valve seat 53 thereby admitting fluid pressure through inlet 47, passages 52, 54, and 55 into diaphragm chamber 73 until sufficient pressure is obtained on diaphragm 63 to kink cable 12 to such an extent that valves 72 and 74 are closed at which time the fluid pressure exerted in chamber 73 balances the force exerted on lug 71 by cable 12. From the diaphragm chamber the fluid pressure passes out through port 60 in outer plate 41 and into conduit 15. Decreased tension in cable 12 resulting from decreased pipe weight causes movement of cable 12 to the right as shown thereby permitting lug 71 and attached plates 61 and 64 to move to the right. Pressure in diaphragm chamber 73 causes such movement thereby unseating ball member 74 of dumb bell valve 56 from seat 69 and permitting pressure in diaphragm chamber 73 to exhaust, through passages 66 and 67, to the atmosphere until sufficient pressure is obtained on diaphragm 63 to kink cable 12 to such an extent that valves 72 and 74 are closed at which time the fluid pressure exerted in chamber 73 balances the force exerted on lug 71 by cable 12.

The fluid pressure signal from weight responsive means 11 passes through conduit 15, through check valve 21, and thence into one end of piston cylinder 20. The fluid pressure signal is exerted against piston head 24 thereby moving head 24 and follower head 26 to the left as seen in Fig. 3 against the force exerted by spring 28 to cause follower head 26 to contact pivot arm 94 thereby moving plunger 89 inwardly against the force of spring member 90. Plunger 89 contacts valve element 86 unseating same against the force exerted by spring 88. This permits fluid to flow through inlet 81 and to pass through chamber 85 past valve 86, through outlet 82 and into passage 38 of hollow piston rod 34. This fluid pressure then passes into master cylinder 32 via port 39 thereby moving piston head 33 and piston rod 34 and connected valve housing 30. This causes plunger 89 to move away from follower head 26. Simultaneously therewith, the movement of piston rod 34 to the left as shown in Fig. 3 moves link chain 37 which is connected thereto. This rotates control shaft 36 which in turn rotates valve control 99 adjusting the overflow level of the water of the brake.

The movement of plunger 89 away from follower head 26 causes plunger 89 to move to the right as shown in Figs. 3 and 5 under the biasing action of spring 90. This permits valve element 86 to again seat on shoulder 87 under the bias of spring 88 and opens passage 91 for fluid communication with port 82 thereby causing exhaust of fluid pressure in cylinder 32 through passages 38 and 91. The check valve 21 in conduit 15 prevents the exhaust of fluid pressure from cylinder 20 hence piston rod 25 and follower head 26 remain in position until additional fluid pressure signals, indicating increased weight of pipe, moves piston head 24 further to the right in Fig. 1 and to the left in Fig. 3, thereby admitting additional water to the brake unit to compensate for the added weight. When pistons 24 and 33 have reached the ends of their respective strokes, they must be reset. When this is desired, valve 22 is operated to exhaust the fluid pressure in cylinder 20 to the atmosphere permitting piston rod 25 to resume its original position. The control assembly 35, valve assembly 30 and piston rod 34 are then re-set to their original positions and the automatic regulating operations continued.

The power apparatus, as described herein, is not to be construed as directed only to positioning a valve since the invention may be employed for positioning other types of equipment or structure in a longitudinal or linear movement as well as in a rotary movement.

Having fully described the objects, structure, and operation of this device, I claim as my invention:

1. A device comprising a control, first and second piston cylinders, first and second pistons slidably arranged in said first and second piston cylinders, respectively, first and second piston rods connected to said first and second pistons, respectively, said first piston rod being spring biased in one direction and movable in response to fluid pressure signals of fluctuating magnitude in an opposite direction, a follower head connected to said first piston rod, a valve assembly connected to said second piston rod, an extension member connecting said valve assembly to said control whereby said control is actuated upon movement of said second piston rod, a contact member pivotally mounted at one end to said extension member, said follower head operatively contacting the other end of said contact member upon movement of said first piston rod in said opposite direction, a source of fluid pressure, a passageway fluidly communicating said valve assembly and said second piston cylinder, said valve assembly including a spring biased plunger having first and second positions and a spring biased valve element having first and second positions, said valve element fluidly communicating said passageway and said source of fluid pressure when in said first position and preventing fluid communication therebetween when in said second position, said plunger being adapted to exhaust said passageway when in said first position and to prevent exhaust of said passageway when in said second position, said plunger moving said valve element from said second to said first position upon movement of said plunger from said first to said second position and said contact member operatively contacting said plunger to move said plunger from said first to said second position upon movement of said follower head in said opposite direction.

2. A fluid motor comprising means movable in response to first fluid pressure signals; means movable in response to second fluid pressure signals; and valve means connected to said second signal responsive means and adapted to permit and prevent fluid flow to and from said second signal responsive means and movable therewith whereby movement of said first signal responsive means actuates said valve means to permit flow of said second fluid pressure signals to said second signal responsive means to move said second signal responsive means, and movement of said second signal responsive means actuates said valve means to permit release of fluid pressure from said second signal responsive means.

3. A fluid motor comprising means movable from a first to a second position in response to first fluid pressure signals of fluctuating magnitude; means for returning said first signal responsive means from said second to said first position upon release of said first fluid pressure signals; means movable in response to second fluid pressure signals; and valve means connected to and movable with said second signal responsive means and adapted to permit and prevent flow of said second fluid pressure signals to said second signal responsive means and to permit release of fluid pressure from said second signal responsive means whereby movement of said first signal responsive means from said first to said second position actuates said valve means to permit flow of said second fluid pressure signals to said second signal responsive means to move said second signal responsive means; and movement of said second signal responsive means actuates said valve means to permit release of fluid pressure from said second signal responsive means.

4. A fluid motor comprising first piston means movable from a first to a second position in response to first fluid pressure signals of fluctuating magnitude; biasing means for returning said first piston means to said first position on release of said first fluid pressure signals; second piston means movable in response to second fluid pressure signals; and valve means connected to said second piston means and adapted to permit and prevent flow of said second fluid pressure signals to said second piston means and to permit release of fluid pressure from said second piston means whereby movement of said first piston means to said second position actuates said valve means to permit flow of said second fluid pressure signals to said second piston means to move said second piston means; and movement of said second piston means actuates said valve means to release fluid pressure from said second piston means.

5. A fluid motor comprising first fluid pressure responsive means including a first piston rod movable selected distances from a first position to second positions in response to first fluid pressure signals of fluctuating magnitude; biasing means adapted to return said first piston rod to said first position from any one of said second positions upon release of said first fluid pressure signals; second fluid pressure responsive means including a second piston rod movable in response to second fluid pressure signals; and a valve assembly provided with valve means having first and second positions and connected to said second piston rod and movable therewith, said valve means being adapted to permit flow of said second fluid pressure signals to said second signal responsive means when in said first position and adapted to permit release of fluid pressure from said second signal responsive means and to prevent flow of second fluid pressure signals to said second signal responsive means when said valve means is in said second position whereby movement of said first piston rod from said first position to a selected second position moves said valve means from said second position to said first position to thereby cause movement of said second piston rod and movement of said second piston rod moving said valve assembly to thereby cause movement of said valve means from said first position to said second position.

6. In a system for automatically regulating the water level of a hydromatic brake for a drilling rig wherein weight responsive means transmits first fluid pressure signals of fluctuating magnitude proportional to the weight of pipe lowered in a borehole, the improvement comprising: first and second piston cylinders, first and second pistons slidably arranged in said first and second piston cylinders, respectively, first and second piston rods connected to said first and second pistons, respectively, said first piston rod being movable selected distances from a first position to second positions in response to said first fluid pressure signals, first biasing means arranged on said first piston rod adapted to urge said first piston rod to said first position, a source of second fluid pressure signals, said second piston rod being movable in response to said second signals and adapted to be operably connected to a control for controlling the water level of a hydromatic brake, a valve assembly provided with a valve means having first and second positions and connected to said second piston rod and movable therewith, said valve means fluidly communicating said second signals and said second piston cylinder when in said first position and preventing fluid communication therebetween and exhausting said second piston cylinder when in said second position, said first piston rod being adapted to move said valve means from said second to said first position when said first piston rod moves to a selected second position, second biasing means arranged on said valve means adapted to urge said valve means from said first to said second position whereby movement of said first piston rod moves said valve means from said second to said first position which thereby causes movement of said second piston rod and valve assembly, movement of said valve assembly causing movement of said valve means from said first to said second position.

References Cited in the file of this patent

UNITED STATES PATENTS

| | | |
|---|---|---|
| 687,273 | Schoeffel | Nov. 26, 1901 |
| 931,228 | Schutte | Aug. 17, 1909 |
| 1,166,956 | Whitesell | Jan. 4, 1916 |
| 1,231,257 | Herr | June 26, 1917 |
| 1,258,337 | Inblum | Mar. 5, 1918 |
| 1,779,656 | Brauer | Oct. 28, 1930 |
| 2,013,810 | Shimek | Sept. 10, 1935 |
| 2,324,174 | Rodgers | July 13, 1943 |
| 2,575,937 | Bent | Nov. 20, 1951 |
| 2,615,431 | Foster | Oct. 28, 1952 |
| 2,696,111 | Conner | Dec. 7, 1954 |
| 2,703,008 | Seljos | Mar. 1, 1955 |
| 2,732,165 | Collingwood | Jan. 24, 1956 |